April 21, 1953   L. R. EIMERMANN   2,635,635
DIAPHRAGM VALVE
Filed Oct. 31, 1949

*INVENTOR.*
LLOYD R. EIMERMANN
BY
Tate & Weikart
ATTORNEYS

Patented Apr. 21, 1953

2,635,635

UNITED STATES PATENT OFFICE 2,635,635

DIAPHRAGM VALVE

Lloyd R. Eimermann, Milwaukee, Wis., assignor to Perfex Corporation, Milwaukee, Wis., a corporation of Wisconsin Application October 31, 1949, Serial No. 124,614

4 Claims. (Cl. 137—657)

This invention relates to an improvement in diaphragm valves for controlling the flow of gaseous fuel to a furnace or similar appliance.

A particular object of the invention is the provision of a valve for fuel control that may be mechanically operated from without the sealed valve compartment to effect operation of parts within the sealed compartment.

A further object of the invention is to provide a diaphragm valve structure which is simplified in construction and therefore readily adaptable to mass production.

A still further object of the invention is to provide a manual reset mechanism capable of controlling the valve when the automatic control has failed or is otherwise incapable of proper control.

Other objects of the invention will appear more fully from the following description and the drawings.

Figure 1:
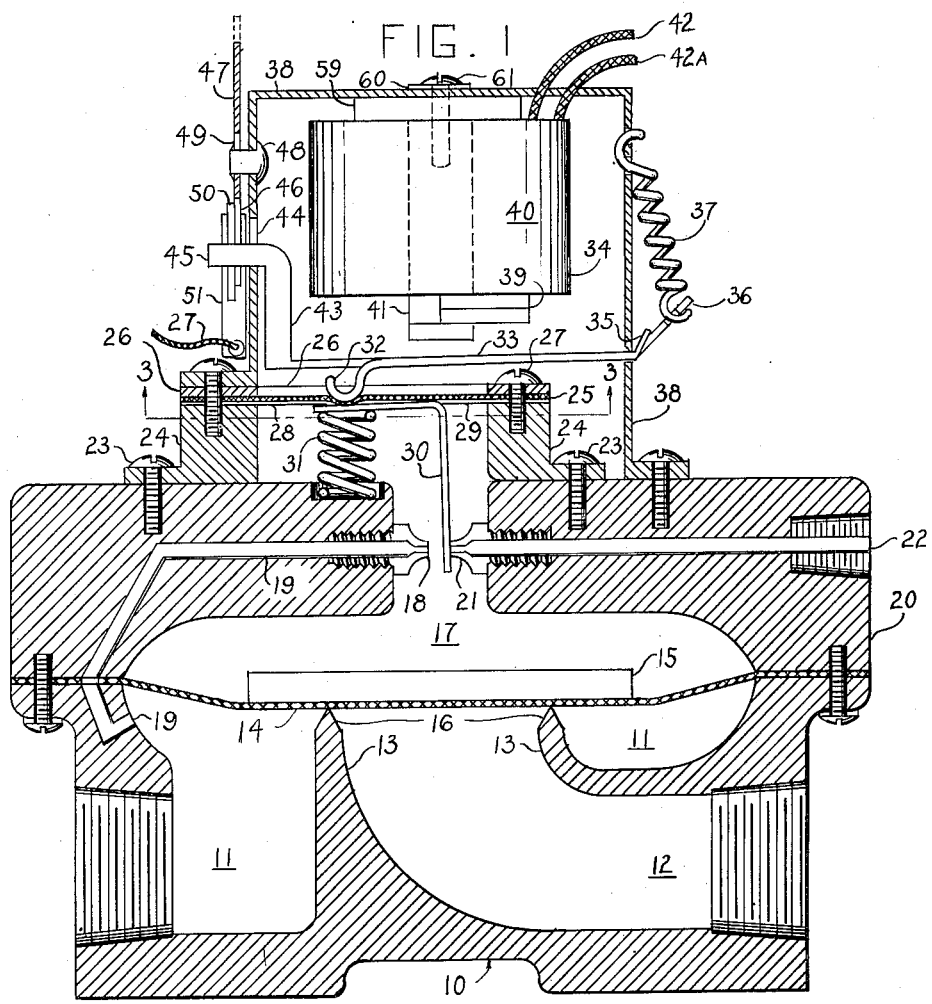
Figure 2:
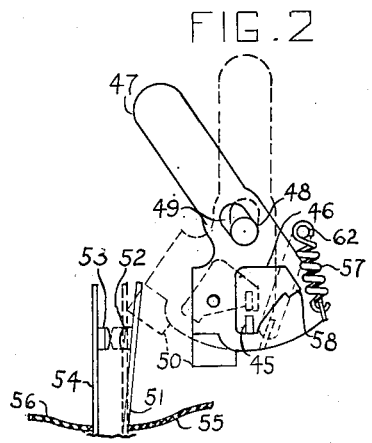
Figure 3:
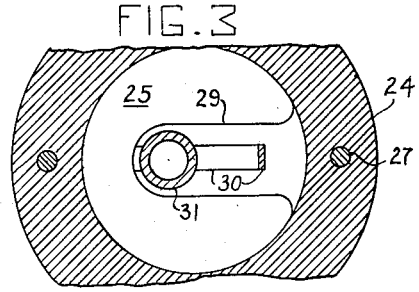

For a more complete understanding of the invention reference should now be had to the drawing, in which Fig. 1 represents a sectional side view of a valve embodying the invention; Fig. 2 is a front view of a portion of Fig. 1 showing the reset mechanism and Fig. 3 is a sectional view taken along lines 3—3 of Fig. 1.

Referring now to Fig. 1, in which is shown a valve body 10 having an inlet 11 leading from a source of gas supply and an outlet 12 leading to a gas burner or other appliance. The inlet 11 and outlet 12 are separated by a ported partition 13. A diaphragm 14, provided with a weight member 15, is biased to closed position against the valve seat 16 which controls the gas flow from inlet to outlet. The diaphragm 14 with the valve body 10 forms an upper chamber 17 which communicates with the inlet chamber 11, thru a jet or orifice portion 18 and opening 19. The upper casing 20 also has a bleed jet or port 21, located in the chamber 17, communicating with the atmosphere at a point adjacent the main gas burner through suitable piping (not shown) secured to upper casing 20 at opening 22. Fastened to the upper casing 20 by screws 23 is a round collar 24 to which is fastened a flexible member or sealing diaphragm 25 secured by annular washer 26 and screws 27. Hingedly supported by collar 24 is a washer-like pivot spring 28 having a tongue-like extension 29 pivotally supporting an L-shaped lever or closure member 30 (Fig. 3), which is secured thereto by any suitable means. Lever 30 performs the function of alternately sealing jets 18 and 21. A resilient means such as spring 31 biases lever 30 clockwise about the hinge 29 against the exterior of diaphragm 25 force exerted by the hook portion 32 of armature lever 33. The lever 33 serves as the armature of an electromagnet 34. The lever 33 is pivoted on and retained in place by upturned end 35, which abuts the sharpened edges of cover 38. Another center upturned portion 36 of arm 33 serves to support a spring 37 fastened at its other end to the cover 38. The spring 37 is biased upwardly to pivot arm 33 counterclockwise around end 35. The electromagnet 34 consists of shading coils 39, coil 40 and core piece 41. The leads 42 and 42A of the coil 40 may be connected to a circuit including a thermostat responsive to temperature variations at a location remote from the diaphragm valve, and a suitable source of power. The electromagnet 34 is fastened to and spaced from the cover 38 by a washer 59, washer 60 and screw 61. Any other conventional method of support would serve the same purpose.

The manual reset mechanism indicated specifically in Fig. 2 will now be described. Projecting from and fastened to arm 33 is a bent arm 43 which extends thru an aperture 44 in the cover 38 (Fig. 1). The end 45 of arm 43 also extends thru a triangular opening 46 in the reset lever 47 (Fig. 2). A manually movable member or reset lever 47 is pivotally secured to cover 38 by rivet 48 and biased in a counterclockwise direction by spring 57. Spring 57 is attached to a pin 62 that is fastened to cover 38 and projects in a line parallel to rivet 48. Note that the length of slot 49 allows lever 47 to be vertically moved in relation to the rivet 48. This allows for manual operation from the manual position back to the automatic as will subsequently be pointed out.

In the automatic position as shown by solid lines in Figs. 1 and 2, the end 45 of arm 43 is free to move up and down in accordance with the movement of armature 33 under the influence of electromagnet 34. This automatic action is thus unhampered or unaffected by the reset lever 47 in the position shown. In the event of a power failure, with a continued demand for heat, manual operation of the gas valve is necessary. This manual operation is accomplished by the operator moving the reset lever 47 in a clockwise direction to the position shown by dotted lines in Fig. 2. The movement of opening 46 cams upwardly the end 45 of arm 43 which subsequently arrives at the position shown in broken lines in Fig. 2. Note that the end 45 is raised above its former position when in the broken line position. This retains the main valve in the open position as will be further described and explained hereafter. A projecting point 50, of lever 47, engages with a contact blade 51 thereby moving switch contact 52, mounted on blade 51, to make contact with a switch contact 53 mounted on a contact blade 54 (Fig. 2). Blade 51 has a lead 55 and blade 54 has a lead 56 which are incorporated in a circuit to be later described. The contact blades 51 and 54 are secured to a terminal board (not shown) and pivot therein at their lower extremities.

Operation

In the position shown in Fig. 1, the main gas valve 16 is closed and no gas will flow from inlet 11 to outlet 12. This condition prevails because: the connection 19 and jet 18 allows the inlet pressure at 11 to be communicated to the upper diaphragm chamber 17, thereby equalizing the pressure on both sides of the diaphragm 14. This equal pressure in both chambers 17 and 11 does not allow a slight seepage thru valve 16 due to pressure fluctuations which are slowly communicated thru orifice 18 to the upper chamber 17 as might be expected, since a greater pressure area, responsive to inlet pressure, exists above the diaphragm 14 than below. Also the weight 15 adds to this downward bias to firmly seat valve 16.

Upon a call for heat from the remote thermostat, a circuit will be closed energizing the electromagnet 34. The energization of the electromagnet 34 will result in attracting the armature lever 33 upwardly against the core piece 41. This action will result in a pivotal clockwise movement of armature lever 33 and arm 43 about the pivot point 35, and against the bias of spring 37 thus raising the hook 32. The bias of spring 31 being directed upwardly will then cause lever 30 to pivot clockwise about the hinge 29, thereby opening jet 21 and closing jet 18. Because the inlet pressure (existing above the diaphragm 14) exceeds atmospheric pressure there will be a resulting bleed (down to atmospheric pressure) from chamber 17 thru jet 21 and out opening 22 to atmosphere. The pressure on the inlet side 11, remaining the same, will result in overcoming the bias of weight 15 and the bias created by the pressure in the upper chamber 17 to raise the diaphragm 14 allowing the gas to flow thru inlet 11 to outlet 12 and the burner.

When the burner has satisfied the thermostat demand, the thermostat circuit to the electromagnet will then open, releasing the armature lever 33 and allowing spring 37 to exert its bias to pivot lever 33 and arm 43 counterclockwise against the bias of spring 31. Note, that hook 32 operates on lever 30 and spring 31 thru the medium of the flexible diaphragm 25. This diaphragm 25 acts as a seal for the upper chamber 17, but allows mechanical forces to be exerted through it as a result of its flexibility. The downward movement of hook 32 pushing against the diaphragm 25, hinge 29, upper leg of lever 30 and spring 31 results in a pivotal counterclockwise movement of lever 30 to open jet 18 and close jet 21.

This allows gas at inlet pressure to flow back into the upper chamber 17 thru opening 19 and jet 18. The resulting equalization of pressures on both sides of diaphragm 18 closes the main valve as heretofore described.

It has been found necessary, with a diaphragm valve of this type, to incorporate some means of manual operation in the event of failure of the electric supply. This invention is provided with a novel type of manual reset shown generally in Fig. 2. The reset lever is shown in solid lines in the automatic position. Upon failure of the power, the operator to insure continued operation of the valve manually moves lever 47 from the position shown by solid lines to the dotted line position. This movement of lever 47 and opening 46 cams end 45 of lever 43 to the broken line position shown in Fig. 2. Because arm 43 is rigidly secured to lever 33 this results in hook 32 being moved to a position somewhat above the diaphragm 25, but not the entire distance to the core piece 41. This releases lever 30 allowing the spring 31 to exert its bias to pivot lever 30 clockwise, thereby closing jet 18 and opening jet 21. This results in the main valve opening as in the automatic action heretofore described.

If the power is subsequently restored while the thermostat is calling for heat and the circuit to electromagnet 34 is therefore closed, electromagnet 34 will thereupon be energized raising armature lever 33 and lever 45. In Fig. 2, note that a spring 57 biases the reset lever 47 in a counterclockwise direction. The lever 47 in the broken line position of Fig. 2 is held against the biasing force of spring 57 by latch means comprising notched recess 58. Consequently upon further upward movement by the end 45 as a result of energization of electromagnet 34, the reset lever 47 is released from the recess 58 and is returned to the automatic position (shown by solid lines) by the spring 57.

In conjunction with the operation of the manual reset mechanism, a switch having contacts 52 and 53 is provided. This switch has for its purpose the completion of a circuit which shunts the thermostat circuit controlling the electromagnet 34, this arrangement being necessary to forestall a lockout which might be caused by the continuing supply of fuel to the furnace. This lockout may be explained as follows, after a failure of the power supply, the operator moves the reset lever 47 to manual position (the broken line position of Fig. 2). This opens the main valve and the fuel supply to the furnace is continued. Should power be restored before the furnace has heated the enclosure to the required temperature, the thermostat contacts will at that time be closed. Restoration of the power supply energizes the electromagnet which will then return the reset mechanism to the automatic position (the solid line position of Fig. 2), as heretofore described. But, in the absence of a thermostat-shunting switch such as switch 52—53, if the power supply remains off for a length of time sufficient to allow the furnace to heat the enclosure beyond the temperature at which the thermostat is set, restoration of the power supply will occur at a time when the thermostat contacts are open. This condition would result in an over supply of fuel with resultant danger of overheating due to this lockout. To obviate this danger, when the operator moves the reset lever 47 to manual position, he also closes the contacts 52 and 53 by means of the projection 50. This switch closes a circuit which shunts the thermostat circuit. Then upon the restoration of power this shunt circuit energizes the electromagnet 34 which returns the reset mechanism to the automatic position as before. To provide for manual operation from the manual position back to the automatic position, the slot 49 enables the operator to press down on lever 47 which disengages arm 45 from slot 58 allowing spring 57 to return lever 47 to the automatic position. This is necessary to provide a manual shut down in the event of prolonged power failure which would allow for manual shut down operation of the main valve during this period.

It is thus apparent that this invention provides a diaphragm valve which is positive in operation and which may be either manually or automatically operated, and which, in manual operation, may be so connected as to be automatically disengaged by the return of electric current to the circuit controlled.

And, while I have shown and described a specific embodiment of the invention, I wish it to be understood that modifications may be made and that no limitations in the invention are intended than are imposed by the scope of the appended claims.

What is claimed is:

1. A valve having a fluid flow passage therethrough, valve means controlling said passage, a fluid pressure operated diaphragm operatively connected to said valve means, a casing overlying said diaphragm, an opening in the casing, a flexible member completely closing said opening, the casing and the flexible member forming a pressure chamber adjacent said diaphragm, means for controlling the fluid pressure in said pressure chamber including a control fluid passage opening into said chamber, a closure member pivotally mounted within said chamber and having one portion freely extending immediately adjacent the inner face of said flexible member and another portion extending in operative relation to said control fluid passage, said closure member being movable to close said control fluid passage upon flexure of said flexible member, actuating means including an electromagnet and a cooperating armature having an energized and a deenergized position, biasing means for moving said closure member to open said control fluid passage when said armature is in its energized position, and means operated by said armature for flexing said flexible member when said armature is in its deenergized position.

2. A valve having a fluid flow passage therethrough, valve means controlling said passage, a fluid pressure operated diaphragm operatively connected to said valve means, a casing overlying said diaphragm, an opening in said casing, a flexible member completely closing said opening, said casing and flexible member forming a pressure chamber adjacent said diaphragm, means for controlling the fluid pressure in said pressure chamber comprising a control fluid passage opening into said chamber, a closure member pivotally mounted within said chamber and having one portion freely extending immediately adjacent the inner face of said flexible member and another portion extending in operative relation to said control fluid passage, said closure member being movable to close said control fluid passage upon flexure of said flexible member, actuating means including an electromagnet and an armature therefor having an energized and a deenergized position, biasing means for moving said closure member to open said control fluid passage when said armature is in its energized position, additional means operated by said armature for flexing said flexible member when said armature is in its deenergized position, a manually movable member pivotally mounted adjacent said actuating means, first cam means carried by said member, cooperating second cam means carried by said armature, the pivotal mounting of said manually movable member permitting both angular and linear motion of said member, said manually movable member angularly between a first position wherein said armature may assume its deenergized position and a second position wherein said armature is cammed into substantially its energized position, biasing means urging said manually movable member into its first position, latch means carried by said manually movable member and cooperating with said second cam means to retain said member in its second position against the biasing force exerted by said biasing means, said latch means being releasable upon manually imparted linear motion of said movable member, and said latch means being releasable upon energization of said electromagnet and resultant movement of said armature.

3. A valve having a fluid flow passage therethrough, valve means controlling said passage, a fluid pressure operated diaphragm operatively connected to said valve means, a casing overlying said diaphragm, an opening in said casing, a flexible member completely closing said opening, said casing and flexible member forming a pressure chamber adjacent said diaphragm, means for controlling the fluid pressure in said pressure chamber comprising a control fluid passage opening into said chamber, a closure member pivotally mounted within said chamber and having one portion freely extending immediately adjacent the inner face of said flexible member and another portion extending in operative relation to said control fluid passage, said closure member being movable to close said control fluid passage upon flexure of said flexible member, actuating means including an electromagnet and an armature therefor having an energized and a deenergized position, biasing means for moving said closure member to open said control fluid passage when said armature is in its energized position, additional means operated by said armature for flexing said flexible member when said armature is in its deenergized position, a manually movable member carrying a cam portion, a cam follower carried by said armature and extending into operative relation with said cam portion, said manually movable member being manually movable between a first position wherein said armature may assume its deenergized position and a second position wherein said armature may assume its deenergized position, resilient means biasing said manually movable member into its said first position, latch means carried by said manually movable member and cooperating with said cam follower to retain said manually movable member in its said second position against the biasing force exerted by said resilient means, and said latch means being releasable upon energization of said electromagnet and resultant movement of said armature.

4. A gas valve comprising a casing having an inlet passage subject to inlet pressure and an outlet passage subject to outlet pressure valve means controlling the flow of gas from said inlet passage to said outlet passage, a pressure responsive diaphragm operatively connected to said valve means, said casing and said diaphragm forming a first pressure chamber above said diaphragm and a second pressure chamber below said diaphragm, means for maintaining the pressure in said second chamber substantially at inlet pressure, means for controlling the pressure within said first chamber comprising a gas passage connecting said inlet passage and said first chamber and terminating in a discharge port within said first chamber, an additional gas passage for bleeding said first chamber to atmosphere and having a bleed port within said first chamber, said discharge port and said bleed port being located in facing relationship within said first chamber, a flexible member forming a portion of said casing, a closure member pivotally mounted within said first chamber and having one portion freely extending immediately adjacent the inner face of said flexible member and another portion extending between the opposed faces of said discharge port and said bleed port, said closure member being movable between a first position wherein said bleed port is closed and said discharge port is open and a second position wherein said discharge port is closed and said bleed port is open, resilient means within said first chamber engaging said one portion of said closure member and biasing said closure member into said second position, actuating means mounted outside said first chamber and adjacent said flexible member comprising an electromagnet having armature means including a part engaging the outer surface of said flexible member, the point of engagement of said part and said flexible member being opposite the point of engagement of said resilient means and said closure member, said part flexing said flexible member inwardly when said electromagnet is de-energized to thereby move said closure member from said second position to said first position against the bias of said resilient means, said part moving in a direction to relieve said flexing when said electromagnet is energized to permit said resilient means to move said closure member into said second position.

LLOYD R. EIMERMANN.

References Cited in the file of this patent

UNITED STATES PATENTS

| Number | Name | Date |
|---|---|---|
| 2,038,748 | Mantz | Apr. 28, 1936 |
| 2,180,288 | Beach | Nov. 14, 1939 |
| 2,222,141 | Denison | Nov. 19, 1940 |
| 2,247,060 | Levine | June 24, 1941 |
| 2,291,783 | Baak | Aug. 4, 1942 |
| 2,292,477 | Ray | Aug. 11, 1942 |
| 2,349,209 | Taylor | May 16, 1944 |
| 2,357,059 | Ray | Aug. 29, 1944 |
| 2,375,100 | Gibbon | May 1, 1945 |
| 2,407,170 | Malek | Sept. 3, 1946 |
| 2,461,615 | Taylor | Feb. 15, 1949 |